United States Patent
Phan et al.

(10) Patent No.: US 12,518,523 B2
(45) Date of Patent: Jan. 6, 2026

(54) SYSTEM AND METHOD FOR PERFORMING DISTANCE METRIC LEARNING USING PROXIES

(71) Applicant: VINBRAIN JOINT STOCK COMPANY, Ha Noi (VN)

(72) Inventors: Nguyen Phan, Ha Noi (VN); Sen Kim Tran, Ha Noi (VN); Huy Duc Ta, Ha Noi (VN); Soan Thi Minh Duong, Ha Noi (VN); Chanh Do Trung Nguyen, Ha Noi (VN); Trung Bui, Ha Noi (VN); Steven Q. H. Truong, Ha Noi (VN)

(73) Assignee: VINBRAIN JOINT STOCK COMPANY, Ha Noi (VN)

( * ) Notice: Subject to any disclaimer, the term of this patent is extended or adjusted under 35 U.S.C. 154(b) by 272 days.

(21) Appl. No.: 18/486,144

(22) Filed: Oct. 12, 2023

(65) Prior Publication Data

US 2025/0124698 A1   Apr. 17, 2025

(51) Int. Cl.
*G06V 10/82* (2022.01)
*G06V 10/26* (2022.01)
*G06V 40/16* (2022.01)

(52) U.S. Cl.
CPC .............. *G06V 10/82* (2022.01); *G06V 10/26* (2022.01); *G06V 40/172* (2022.01)

(58) Field of Classification Search
CPC ...... G06V 10/26; G06V 10/82; G06V 10/761; G06V 10/774; G06V 40/172
See application file for complete search history.

(56) References Cited

U.S. PATENT DOCUMENTS 10,387,749 B2 * 8/2019 Movshovitz-Attias ..................... G06F 18/217
2017/0228641 A1 * 8/2017 Sohn ....................... G06F 17/11

OTHER PUBLICATIONS

Movshovitz-Attias, et al. (No Fuss Distance Metric Learning using Proxies), pp. 360-368 (Year: 2017).*
Chan, et al. (Multi-proxy based deep metric learning), pp. 1-13. (Year: 2023).*

* cited by examiner

*Primary Examiner* — Daniel G Mariam
(74) *Attorney, Agent, or Firm* — United One Law Group LLC; Kongsik Kim; Jhongwoo Peck

(57) ABSTRACT

A method and a system for performing distance metric learning using proxies are provided. The method for performing distance metric learning assigns a proxy as an anchor to represent a class and associates the proxy with all data points in a training batch. The method allows data points to interact with each other via proxies during training. Additionally, the fine-grained data-to-data relation is actively considered, which is combined with a learnable margin parameter leading to intra-class compactness and inter-class separability.

12 Claims, 6 Drawing Sheets

SYSTEM AND METHOD FOR PERFORMING DISTANCE METRIC LEARNING USING PROXIES

TECHNICAL FIELD

The present disclosure relates generally to machine learning. More particularly, the present disclosure relates to a system and a method for performing distance metric learning using proxies.

RELATED ART

Recently, Deep Metric Learning (DML) has been of interest due to its visual recognition applications, e.g. face recognition and image retrieval [1-6]. DML aims to learn a representation function, mapping the images of objects to an embedded space in which embeddings of the same-class data are closed and ones of the different classes are far apart [7]. Several DML methods have been proposed, they are varied by the loss functions, being split into two categories: pair-based and proxy-based.

Pair-based metric learning is trained with the loss derived from the embedding-based distances between pairs of data [8]. The first pair-based loss, named contrastive loss [9], aims to minimize the embedding distance of identical-class input pairs and maximize the distance otherwise. Alternatively, the triplet loss uses three data points (two of the same class and one of the other) and constraints the embedding distance of the samples, i.e. minimizing the distance between the anchor and positive sample and maximizing the distance between the anchor and the negative sample [10]. The model trained with contrastive or triplet loss mostly depends on effective sampling strategies; precisely, the easy pairs (i.e. inter-class with distinctive content or intra-class with similar content) do not help to improve the convergence rates [5]. To overcome the issue, N-pair loss [6] and lifted-structure loss [7] are proposed to consider the hard pairs into the training process. N-pair loss picks out one positive sample from N−1 negative samples, while lifted-structure loss picks out one positive sample with all negative samples in a training batch. Although the n-pair and lifted structure losses involve the hardness of data, they do not reveal the entire data-to-data relationship [11]. Pair-based methods generally have high training complexity as the input always includes multiple data pairs, subsequently resulting in slow convergence [12].

Proxy-based metric learning introduces the proxies representing groups of same-class data from the training set. The proxy-based loss is derived from the proxy-data pairs instead of data-data pairs, significantly reducing the number of input pairs during the training [5]. In other words, the proxy based approach addresses the training complexity issue of the pair-based approach. The first proxy-based loss, named ProxyNCA, builds the proxies using neighborhood component analysis [13]. ProxyNCA pulls input samples with their respective class proxies together and pushes them apart otherwise. SoftTriple loss uses multiple proxies for a class instead of only one in ProxyNCA; providing more flexibility for modeling intra-class variance in real-world datasets [14]. An extension of ProxyNCA is ProxyNCA++, it renovates the components of ProxyNCA [15]. ProxyNCA is insensitive to noisy data and is potential to enable faster training convergence. However, it does not exploit data-to-data relations since it associates each data point only with proxies. Proxy anchor (PA) loss is proposed to handle entire data in the batch and associate them with each proxy by their relative hardness in data-to-data relations [12]. PA achieves state of the art on several datasets [12].

The performance of PA depends on the selection of hyperparameters, such as the margin and scaling parameters. In practice, the hyperparameter selection is often done via grid search or optimization algorithm, e.g. Tree of Parzen Estimator algorithm [16, 17]. Both methods are very time-consuming and expertise-required. Furthermore, the effects of the margin value are not thoroughly mentioned, implying a certain number of trials and several training tricks to be conducted for the best performance. Besides, whether equal or different margin among classes is good for proxy-anchor metric learning has not been solved. There is a need to investigate the margin setting of classes in metric learning.

CITATION LIST

Non-Patent Literature

1. W. Liu, Y Wen, Z. Yu, M. Li, B. Raj, and L. Song, "SphereFace: deep hypersphere embedding for face recognition", in Proc. IEEE Conference on Computer Vision and Pattern Recognition, 2017, pp. 212-220. The citation is herein referred to as [1].
2. F. Wang, J. Cheng, W. Liu, and H. Liu, "Additive margin softmax for face verification", IEEE Signal Processing Letters, p. 926-930, 2018. The citation is herein referred to as [2].
3. H. Wang, Y Wang, Z. Zhou, X. Ji, D. Gong, J. Zhou, Z. Li, and W. Liu, "CosFace: large margin cosine loss for deep face recognition", in Proc. IEEE Conference on Computer Vision and Pattern Recognition, 2018, pp. 5265-5274. The citation is herein referred to as [3].
4. F. Schroff, D. Kalenichenko, and J. Philbin, "FaceNet: a unified embedding for face recognition and clustering", in Proc. IEEE Conference on Computer Vision and Pattern Recognition, 2015, pp. 815-823. The citation is herein referred to as [4].
5. Y Movshovitz-Attias, A. Toshev, T. Leung, S. Ioffe, and S. Singh, "No fuss distance metric learning using proxies", in Proc. IEEE International Conference on Computer Vision, 2017, pp. 360-368. The citation is herein referred to as [5].
6. K. Sohn, "Improved deep metric learning with multiclass n-pair loss objective", in Advances in Neural Information Processing Systems, 2016, pp. 1857-1865. The citation is herein referred to as [6].
7. H. Oh Song, Y Xiang, S. Jegelka, and S. Savarese, "Deep metric learning via lifted structured feature embedding", in Proc. IEEE Conference on Computer Vision and Pattern Recognition, 2016, pp. 4004-4012. The citation is herein referred to as [7].
8. J. Bromley, J. Bentz, L. Bottou, I. Guyon, Y LeCun, C. Moore, E. Sackinger, and R. Shah, "Signature verification using a "siamese" time delay neural network", International Journal of Pattern Recognition and Artificial Intelligence, pp. 669-688, 1993. The citation is herein referred to as [8].
9. S. Chopra, R. Hadsell, and Y LeCun, "Learning a similarity metric discriminatively, with application to face verification", in Proc. IEEE Computer Society Conference on Computer Vision and Pattern Recognition, 2005, pp. 539-546. The citation is herein referred to as [9].
10. E. Hoffer and N. Ailon, "Deep metric learning using triplet network", in International Workshop on Similarity-based Pattern Recognition, 2015, pp. 84-92. The citation is herein referred to as [10].

11. X. Wang, X. Han, W. Huang, D. Dong, and M. Scott, "Multi-similarity loss with general pair weighting for deep metric learning", in Proc. IEEE/CVF Conference on Computer Vision and Pattern Recognition, 2019, pp. 5022-5030. The citation is herein referred to as [11].
12. S. Kim, D. Kim, M. Cho, and S. Kwak, "Proxy anchor loss for deep metric learning", in Proc. IEEE/CVF Conference on Computer Vision and Pattern Recognition, 2020, pp. 3238-3247. The citation is herein referred to as [12].
13. J. Goldberger, G. Hinton, S. Roweis, and R. Salakhutdinov, "Neighbourhood components analysis", Advances in Neural Information Processing Systems, 2004. The citation is herein referred to as [13].
14. Q. Qian, L. Shang, B. Sun, J. Hu, H. Li, and R. Jin, "SoftTriple loss: deep metric learning without triplet sampling", in Proc. IEEE/CVF International Conference on Computer Vision, 2019, pp. 6450-6458. The citation is herein referred to as [14].
15. E. Teh, T. DeVries, and G. Taylor, "ProxyNCA++: revisiting and revitalizing proxy neighborhood component analysis", in Proc. Euroupean Conference Computer Vision, 2020, pp. 448-464. The citation is herein referred to as [15].
16. J. Bergstra, R. Bardenet, Y Bengio, and Kegl B., "Algorithms for hyperparameter optimization", in Proc. International Conference on Neural Information Processing Systems, 2011, p. 2546-2554. The citation is herein referred to as [16].
17. J. Bergstra, D. Yamins, and D. D. Cox, "Making a science of model search: hyperparameter optimization in hundreds of dimensions for vision architectures", in Proc. International Conference on Machine Learning, 2013, p.I-115-I-123. The citation is herein referred to as [17].
18. C. Wah, S. Branson, P. Welinder, P. Perona, and S. Belongie, "The Caltech-UCSD Birds-200-2011 Dataset," Tech. Rep. CNS-TR-2011-001, California Institute of Technology, 2011. The citation is herein referred to as [18].
19. J. Krause, M. Stark, J. Deng, and L. Fei-Fei, "3D object representations for fie-grained categorization," in Proc. IEEE International Conference on Computer Vision Workshops, 2013, pp. 554-561. The citation is herein referred to as [19].
20. Z. Liu, P. Luo, S. Qiu, X. Wang, and X. Tang, "DeepFashion: powering robust clothes recognition and retrieval with rich annotations," in Proc. IEEE Conference on Computer Vision and Pattern Recognition, 2016, pp. 1096-1104. The citation is herein referred to as [20].
21. A. Zhai and H. Wu, "Classifiation is a strong baseline for deep metric learning," arXiv preprint arXiv:1811.12649, 2018. The citation is herein referred to as [21].
22. M. Boudiaf, J. Rony, I. Ziko, E. Granger, M. Pedersoli, P. Piantanida, and I. Ayed, "A unifying mutual information view of metric learning: cross-entropy vs. pairwise losses," in European Conference on Computer Vision, 2020, pp. 548-564. The citation is herein referred to as [22].
23. H. Xuan, A. Stylianou, and R. Pless, "Improved embeddings with easy positive triplet mining," in Proc. IEEE/CVF Winter Conference on Applications of Computer Vision, 2020, pp. 2474-2482. The citation is herein referred to as [23].
24. J. Seidenschwarz, I. Elezi, and L. Leal-Taixé, "Learning intra-batch connections for deep metric learning," arXiv preprint arXiv:2102.07753, 2021. The citation is herein referred to as [24].
25. K. He, X. Zhang, S. Ren, and J. Sun, "Deep residual learning for image recognition," in Proc. IEEE Conference on Computer Vision and Pattern Recognition, 2016, pp. 770-778. The citation is herein referred to as [25].

SUMMARY

The invention has been made to solve the above-mentioned problems, and an object of the invention is to provide a method and system for performing distance metric learning using proxies that treats a margin as a learnable parameter and does not require many trials and expertise to select an optimal margin value.

Problems to be solved in the embodiments are not limited thereto and include the following technical solutions and also objectives or effects understandable from the embodiments.

According to a first aspect of the invention, there is provided a computer-implemented method for performing distance metric learning using proxies, the method comprises:

accessing, by one or more computing devices, a training dataset that comprises a plurality of data points, wherein the plurality of data points is respectively associated with a plurality of classes;

accessing, by the one or more computing devices, at least one proxy that represents two or more data points included in the training dataset, wherein the at least one proxy and the two or more data points are associated with a first class;

processing, by the one or more computing devices, a first subset of data points in the plurality of data points that are associated with the first class and a second subset of data points in the plurality of data points that are associated with one or more classes that are different from the first class using a machine learning model to generate a positive subset of embedding vectors and a negative subset of embedding vectors, respectively;

determining, by the one or more computing devices, an intra-class loss that measures a first distance between the at least one proxy and each positive embedding vector in the positive subset of embedding vectors, wherein the intra-class loss further comprises a first learnable margin parameter assigned for the first class to measure a confidence level the machine learning model has in regard to a decision boundary of the machine learning model for the first class;

determining, by the one or more computing devices, an inter-class loss that measures a second distance between the at least one proxy and each negative embedding vector in the negative subset of embedding vectors; wherein the inter-class loss further comprises one or more learnable margin parameters assigned for the one or more classes to measure confidence levels the machine learning model has in regard to decision boundaries of the machine learning model respectively for the one or more classes;

determining, by the one or more computing devices, a margin loss that is calculated as a mean of the first learnable margin parameter and the one or more learnable margin parameters to control the variance of the first learnable margin parameter and the one or more learnable margin parameters; and adjusting, by the one or more computing devices, the first learnable margin parameter and the one or more learnable margin parameters of the machine learning model based at least on the intra-class loss, the inter-class loss and the margin loss.

According to a second aspect of the invention, there is provided a computer system for performing distance metric learning using proxies. The computer system comprises:

a machine learning model configured to receive input data points and, in response, provide respective embedding vectors for the input data points within an embedding space;

one or more processors; and one or more non-transitory computer readable media that collectively store instructions that, when executed by the one or more processors cause the computer system to perform operations including steps of the method according to the first aspect of the invention.

BRIEF DESCRIPTION OF THE DRAWINGS

The above and other objects, features, and advantages of the present invention will become more apparent to those of ordinary skill in the art by describing in detail exemplary embodiments thereof with reference to the attached drawings, in which.

DETAILED DESCRIPTION

While the invention may have various modifications and alternative forms, specific embodiments thereof are shown by way of example in the drawings and will be described herein in detail. However, there is no intent to limit the invention to the particular forms disclosed. On the contrary, the invention is to cover all modifications, equivalents, and alternatives falling within the spirit and scope of the appended claims.

It should be understood that, although the terms "first," "second," and the like may be used herein to describe various elements, the elements are not limited by the terms. The terms are only used to distinguish one element from another element. For example, a first element could be termed a second element, and, similarly, a second element could be termed a first element without departing from the scope of the invention. As used herein, the term "and/or" includes any and all combinations of one or more of the associated listed items.

The terminology used herein is for the purpose of describing particular embodiments only and is not intended to be limiting to the invention. As used herein, the singular forms "a," "an," "another," and "the" are intended to also include the plural forms, unless the context clearly indicates otherwise. It should be further understood that the terms "comprise," "comprising," "include," and/or "including," when used herein, specify the presence of stated features, integers, steps, operations, elements, parts, or combinations thereof, but do not preclude the presence or addition of one or more other features, integers, steps, operations, elements, parts, or combinations thereof.

Unless otherwise defined, all terms including technical and scientific terms used herein have the same meaning as commonly understood by one of ordinary skill in the art to which this invention belongs. It should be further understood that terms, such as those defined in commonly used dictionaries, should be interpreted as having a meaning that is consistent with their meaning in the context of the relevant art and are not to be interpreted in an idealized or overly formal sense unless expressly so defined herein.

Hereinafter, embodiments will be described in detail with reference to the accompanying drawings, the same or corresponding components are denoted by the same reference numerals regardless of reference numbers, and thus the description thereof will not be repeated.

And throughout the detailed description and claims of the present disclosure, the term "training/trained" or "learning/learned" refers to performing machine learning through computing in accordance with a procedure. It will be appreciated by those skilled in the art that it is not intended to refer to a mental function such as human educational activity.

As used herein, a model is trained to output a predetermined output with respect to a predetermined input, and may include, for example, neural networks. A neural network refers to a recognition model that simulates a computation capability of a biological system using a large number of artificial neurons being connected to each other through edges.

The neural network uses artificial neurons configured by simplifying functions of biological neurons, and the artificial neurons may be connected to each other through edges having connection weights. The connection weights, parameters of the neural network, are predetermined values of the edges, and may also be referred to as connection strengths. The neural network may perform a cognitive function or a learning process of a human brain through the artificial neurons. The artificial neurons may also be referred to as nodes.

A neural network may include a plurality of layers. For example, the neural network may include an input layer, a hidden layer, and an output layer. The input layer may receive an input to be used to perform training and transmit the input to the hidden layer, and the output layer may generate an output of the neural network based on signals received from nodes of the hidden layer. The hidden layer may be disposed between the input layer and the output layer. The hidden layer may change training data received from the input layer to an easily predictable value. Nodes included in the input layer and the hidden layer may be connected to each other through edges having connection weights, and nodes included in the hidden layer and the output layer may also be connected to each other through edges having connection weights. The input layer, the hidden layer, and the output layer may respectively include a plurality of nodes.

Hereinafter, training a neural network refers to training parameters of the neural network. Further, a trained neural network refers to a neural network to which the trained parameters are applied.

Basically, the neural network may be trained through supervised learning or unsupervised learning. Supervised learning refers to a method of providing input data and label corresponding thereto to the neural network, while in unsupervised learning, the input data provided to the neural network does not contain label.

Figure 1:
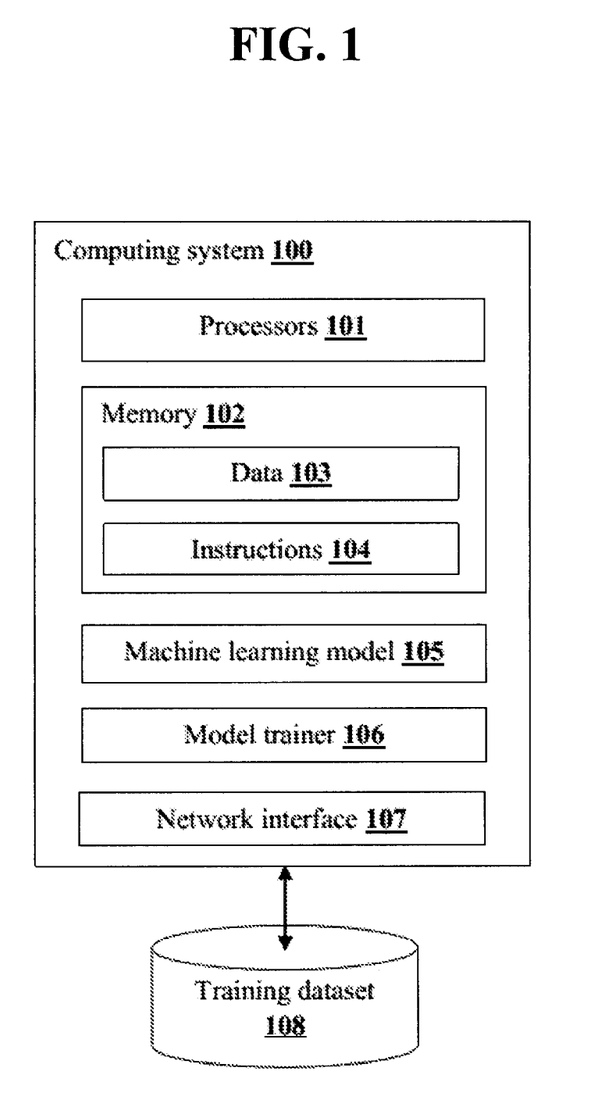
FIG. 1 is a block diagram showing an example system for performing distance metric learning using proxies.

FIG. 1 depicts an example computing system 100 that can implement the present disclosure. The computing system 100 can include one or more physical computing devices. The one or more physical computing devices can be any type of computing device, including a server computing device, a personal computer (e.g., desktop or laptop), a mobile computing device (e.g., smartphone or tablet), an embedded computing device, or other forms of computing devices, or combinations thereof. The computing device(s) can operate sequentially and/or in parallel. In some embodiments, the computing device(s) can implement various distributed computing techniques.

The computing system 100 includes one or more processors 101 and a memory 102. The one or more processors 101 can be any suitable processing device (e.g., a processor core, a microprocessor, an ASIC, a FPGA, a controller, a microcontroller, etc.) and can be one processor or a plurality of processors that are operatively connected. The memory 102 can include one or more non-transitory computer-readable storage mediums, such as RAM, ROM, EEPROM, EPROM, flash memory devices, magnetic disks, etc., and combinations thereof. The memory 102 can store data 103 and instructions 104 which are executed by the processor(s) 101 to cause the computing system 100 to perform operations.

The computing system 100 can further include a machine learning model 105. In some embodiments, the machine learning model 105 can be or have been trained to provide, for a pair of proxy-data point, a distance between a proxy and a data point in the pair of proxy-data point. For example, the distance can be descriptive of a similarity or relatedness between the proxy and the data point in the pair of proxy-data point, where a larger distance indicates less similarity.

As one example, the machine learning model 105 can receive input data point or instance (e.g., an image) and, in response, provide an embedding vector within an embedding space. For example, the embedding vector can be provided at a final layer of the machine learning model 105 or a close to final, but not final layer of the machine learning model 105. In some embodiments, the embedding vector provided by the machine learning model 105 for one data point or instance can be compared to a proxy being an anchor representing a class to determine a measure of similarity (e.g., a distance) between the data point or instance and the proxy. For example, a Euclidian distance between the embedding vector and the proxy can be indicative of an amount of similarity (e.g., smaller distances indicate more similarity).

In some embodiments, the machine learning model 105 can be or include a neural network (e.g., deep neural network). Neural networks can include feed-forward neural networks, recurrent neural networks, convolutional neural networks, and/or other forms of neural networks. In other implementations, the machine learning model 105 can be or include other types of machine-learned models.

In some embodiments, the machine learning model 105 can include or have associated therewith a proxy matrix or other data structure that includes a number of proxies (e.g., proxy vectors). As described above, in some embodiments, the proxy matrix can be viewed as parameters of the machine learning model 105 itself or can otherwise be jointly trained with the machine learning model 105.

The computing system 100 can further include a model trainer 106. The model trainer 106 can train the machine learning model 105 using various training or learning techniques, such as, for example, backwards propagation of errors, stochastic gradient descent, etc. The model trainer 106 can perform a number of generalization techniques (e.g., weight decays, dropouts, etc.) to improve the generalization capability of the models being trained.

In particular, the model trainer 106 can train a machine learning model 105 based on a set of training data 108. In some embodiments, the training dataset 108 can include instances that are labeled (e.g., have one or more labels associated therewith). For example, the labels can correspond to classes or semantic concepts. In other embodiments, the training dataset 108 can include instances that are unlabeled (e.g., do not have one or more labels associated therewith). In some embodiments, each instance in the training dataset 108 can be or include images which are resized and cropped to a predetermined size as input.

The model trainer 106 can include a computer logic utilized to provide desired functionality. The model trainer 106 can be implemented in hardware, firmware, and/or software controlling a general purpose processor. For example, in some embodiments, the model trainer 106 includes program files stored on a storage device, loaded into a memory and executed by one or more processors. In other implementations, the model trainer 106 includes one or more sets of computer-executable instructions that are stored in a tangible computer-readable storage medium such as RAM hard disk or optical or magnetic media.

The computing system 100 can also include a network interface 107 used to communicate with one or more systems or devices, including systems or devices that are remotely located from the computing system 100. The network interface 107 can include any number of components to provide networked communications (e.g., transceivers, antennas, controllers, cards, etc.).

The memory 102 stores data 103 and instructions 104 which are executed by the processor(s) 101 to cause the model trainer 106 of the computing system 100 to perform the operations for distance metric learning using proxies as follows.

The model trainer 106 accesses the training dataset 108 in which the training dataset 108 comprises a plurality of data points. As an example, the plurality of data points is respectively associated with a plurality of classes in which each data point in the plurality of data points is associated with a class in the plurality of classes.

Subsequently, the model trainer 106 initializes a plurality of proxies in the training dataset 108 with normal distribution as suggested in [12] in which each proxy is a trainable vector that represents a group of data points and then respectively associates the plurality of proxies with the plurality of classes. As one example, the number of proxies can be equal to a number of classes associated in the training dataset. As another example, any number of proxies can be used.

Subsequently, the model trainer 106 accesses at least one proxy in the plurality of proxies. The at least one proxy represents two or more data points included in the training dataset 108, in which the at least one proxy and the two or more data points are associated with a same class, for example, a first class.

Subsequently, the model trainer 106 processes a first subset of data points in the plurality of data points that are associated with the first class and a second subset of data points in the plurality of data points that are associated with one or more classes that are different from the first class using the machine learning model 105 to generate a positive subset of embedding vectors and a negative subset of embedding vectors, respectively.

Subsequently, the model trainer 106 determines an intra-class loss that measures a first distance between the at least one proxy and each positive embedding vector in the positive subset of embedding vectors. The intra-class loss further comprises a first learnable margin parameter assigned for the first class to measure a confidence level the machine learning model has in regard to a decision boundary of the machine learning model for the first class.

Subsequently, the model trainer 106 determines an inter-class loss that measures a second distance between the at least one proxy and each negative embedding vector in the negative subset of embedding vectors. The inter-class loss further comprises one or more learnable margin parameters assigned for the one or more classes to measure confidence levels the machine learning model has in regard to decision boundaries of the machine learning model respectively for the one or more classes.

A proxy anchor loss is a combination of two components which are the intra-class loss and the inter-class loss which can be written in Equation 1.

$$L_{proxy}(X) = \frac{1}{|P^+|}\left(\sum_{p \in P^+} \log(1 + \sum_{x \in X_p^+} e^{-\alpha(s(x,p)-m_x)})\right) + \frac{1}{|P|}\left(\sum_{p \in P} \log(1 + \sum_{x \in X_p^-} e^{\alpha(s(x,p)+m_x)})\right).$$ [Equation 1]

In Equation 1, the first term corresponds to the intra-class loss and the second term corresponds to the inter-class loss;

X denotes a set of batch embedding vectors;

$P^+$ denotes proxies of existing classes in the batch;

P denotes all proxies in the training dataset;

$X_p^+$ denotes the positive subset of embedding vectors of X which has the same class as proxy p;

$X_p^-$ denotes the negative subset of embedding vectors of X which has the different class as proxy p;

|·| denotes the cardinality of the corresponding set;

s(.,.) denotes a cosine similarity (distance between) two input vectors;

$L_{proxy}$ denotes the proxy anchor loss;

$m_x$ denotes a learnable margin parameter of the same class as the embedding vector x; and α denotes a predetermined scaling parameter.

In training the proxy anchor loss, a large value of margin parameters easily leads to overfitting. To constraint values of margin parameters, a margin loss is introduced to control the variance of margin parameters. In particular, the model trainer 106 determines a margin loss that is calculated as a mean of the first learnable margin parameter and the one or more learnable margin parameters which can be written in Equation 2.

$$L_{margin} = \frac{1}{C}\sum_{i=1}^{C} m_i$$ [Equation 2]

In Equation 2, $L_{margin}$ denotes the margin loss;

$m_i$ denotes the learnable margin parameter of $i^{th}$ class; and

C denotes the number of the classes.

Accordingly, an adaptive anchor loss for training the machine learning model 105 is a combination of the proxy anchor loss and the margin loss which can be written in Equation 3.

$$L_{adaptive}(X) = L_{proxy}(X) + \lambda L_{margin}$$ [Equation 3]

In Equation 3, $L_{adaptive}$ denotes the adaptive anchor loss; and

λ denotes a positive regularization parameter.

The model trainer 106 adjusts the first learnable margin parameter and the one or more learnable margin parameters of the machine learning model based on the adaptive anchor loss. In some embodiments, the model trainer 106 adjusts the first learnable margin parameter and the one or more learnable margin parameters by minimizing the intra-class loss, maximizing the inter-class loss and optimizing the margin loss. In some embodiments, the adjusting of the first learnable margin parameter and the one or more learnable margin parameters comprises jointly backpropagating the intra-class loss, the inter-class loss and the margin loss through the machine learning model 105.

After the model trainer 106 adjusts one or more parameters of the machine learning model based at least on the intra-class loss, the inter-class loss and the margin loss, the computing system 100 employs the machine learning model 105 to perform a face recognition task or an image retrieval task.

Figure 2:
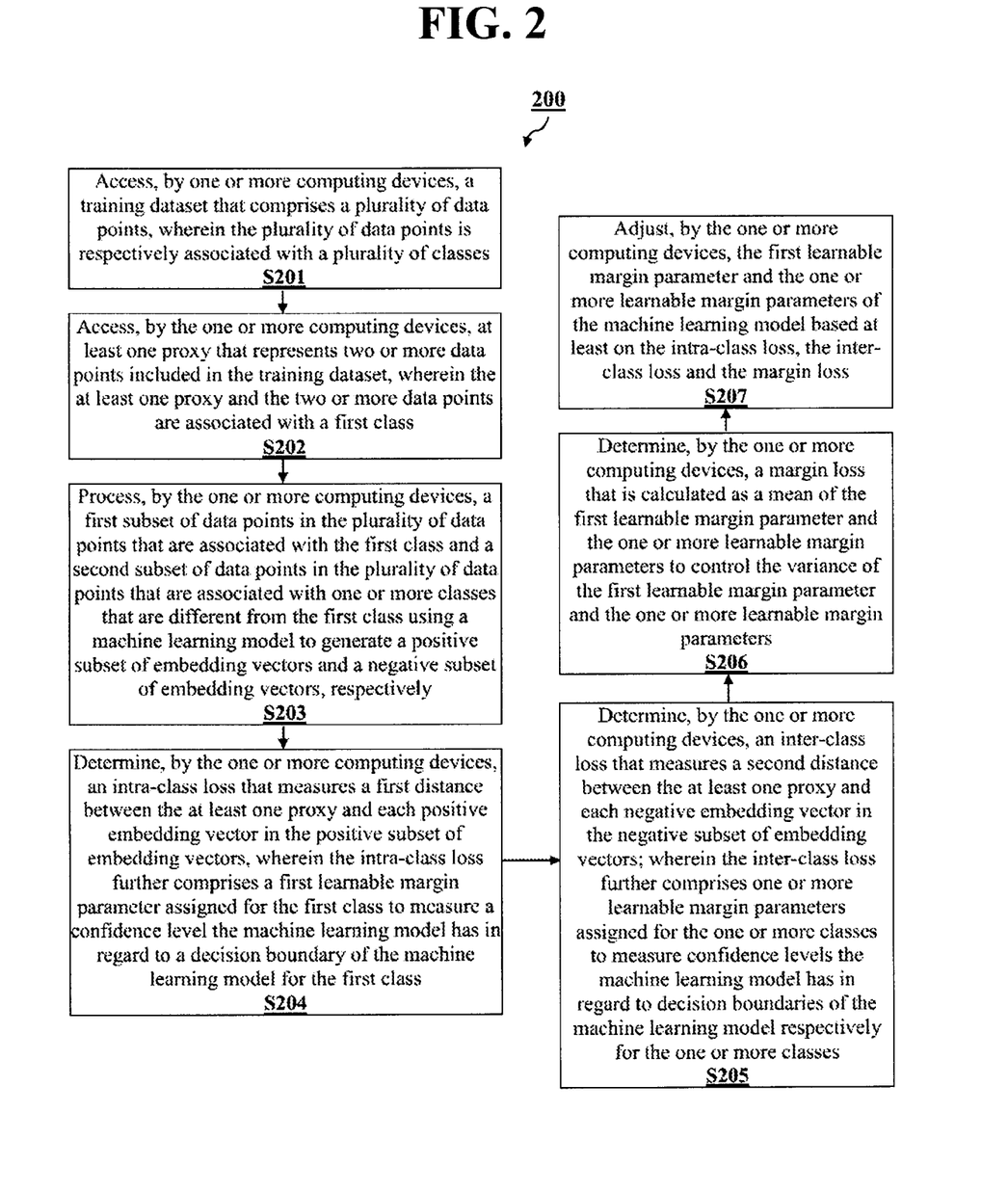
FIG. 2 is a flow diagram of an example method for performing distance metric learning using proxies.

FIG. 2 depicts a flow chart diagram of example method 200 for performing distance metric learning using proxies according to example embodiments of the present disclosure. For convenience, the method 200 will be described as being performed by a computing system, e.g., the computing system 100 for performing distance metric learning using proxies (hereinafter referred to as "the computing system") of FIG. 1.

In step S201, the computing system accessing a training dataset (for example, the training dataset 108 of FIG. 1) that comprises a plurality of data points that is respectively associated with a plurality of classes in which each data point in the plurality of data points is associated with a class in the plurality of classes.

In step S202, the computing system accesses at least one proxy that represents two or more data points included in the training dataset, wherein the at least one proxy and the two or more data points are associated with a first class. Before conducting step S202, the computing system initializes a plurality of proxies in the training dataset in which each proxy is a trainable vector that represents a group of data points of a same class and then respectively associates the plurality of proxies respectively with the plurality of classes.

In step S203, the computing system processes a first subset of data points in the plurality of data points that are associated with the first class and a second subset of data points in the plurality of data points that are associated with one or more classes that are different from the first class using a machine learning model (for example, the machine learning model 105 of FIG. 1) to generate a positive subset of embedding vectors and a negative subset of embedding vectors, respectively.

In step S204, the computing system determines an intra-class loss that measures a first distance between the at least one proxy and each positive embedding vector in the positive subset of embedding vectors, in which the intra-class loss further comprises a first learnable margin parameter assigned for the first class to measure a confidence level the machine learning model has in regard to a decision boundary of the machine learning model for the first class.

In step S205, the computing system determines an inter-class loss that measures a second distance between the at least one proxy and each negative embedding vector in the negative subset of embedding vectors, in which the inter-class loss further comprises one or more learnable margin parameters assigned for the one or more classes to measure confidence levels the machine learning model has in regard to decision boundaries of the machine learning model respectively for the one or more classes.

A proxy anchor loss is a combination of two components which are the intra-class loss and the inter-class loss which can be written in Equation 1 as mentioned in the description of FIG. 1, so detailed description thereof is omitted to avoid repetition.

In step S206, the computing system determines a margin loss that is calculated as a mean of the first learnable margin parameter and the one or more learnable margin parameters to control the variance of the first learnable margin parameter and the one or more learnable margin parameters. The margin loss can be written in Equation 2 as mentioned in the description of FIG. 1, so detailed description thereof is omitted to avoid repetition.

In step S207, the computing system adjusts the first learnable margin parameter and the one or more learnable margin parameters of the machine learning model based on the adaptive anchor loss. In some embodiments, the model computing system adjusts the first learnable margin parameter and the one or more learnable margin parameters by minimizing the intra-class loss, maximizing the inter-class loss and optimizing the margin loss. In some embodiments, the adjusting of the first learnable margin parameter and the one or more learnable margin parameters comprises jointly backpropagating the intra-class loss, the inter-class loss and the margin loss through the machine learning model.

After the computing system adjusts one or more parameters of the machine learning model based at least on the intra-class loss, the inter-class loss and the margin loss, the computing system employs the machine learning model to perform a face recognition task or an image retrieval task.

Experiments

In this section, the datasets and experimental settings will be firstly described. Then the experimental results of the system and method of the invention compared to the state-of-the-art metric learning methods will be described. Finally, the configurations of the system and method of the invention are described. The system and method of the invention and term Adaptive Proxy Anchor method (hereinafter referred to as proposed APA) can be used interchangeably.

1. Datasets and Settings

The system and method of the invention is evaluated on four public datasets: Stanford Online Products (SOP) [7], CUB-200-2011 [18], Car196 [19], In-Shop clothes Retrieval (In-shop) [20], in which Table 1 shows the statistics in detail. For all experiments, the images were resized to 256×256 and cropped to 224×224, a was set to 32 for all experiments as suggested in [12]. Only cropping and flipping were used as augmentations.

TABLE 1

Information of four dataset including the figures of train, test classes and images of each dataset.

| | Train | | Test | |
|---|---|---|---|---|
| Datasets | Classes | Images | Classes | Images |
| CUB-200-2011 | 100 | 5,864 | 100 | 5,924 |
| CAR196 | 98 | 8,054 | 98 | 8,131 |
| SOP | 11,318 | 59,551 | 11,316 | 60,502 |
| In-Shop | 3,997 | 28,882 | 3,985 | 28,760 |

For a fair comparison, the PA results were reproduced and the proposed APA experiments were conducted using the same training pipeline. The proxies were initialized with normal distribution as suggested in [12]. ResNet-50 [25] was used as the backbone to extract the features. The last fully-connected layer was changed to obtain the dimensionality of embedding vectors and L2-normalized before returning the final output.

To evaluate the methods' performance, Recall@K was used in which a higher value indicates a better model. All timing results were collected on a docker container with a single A100 GPU of 40 GB RAM.

2. Comparison to Other Methods

Figure 3:
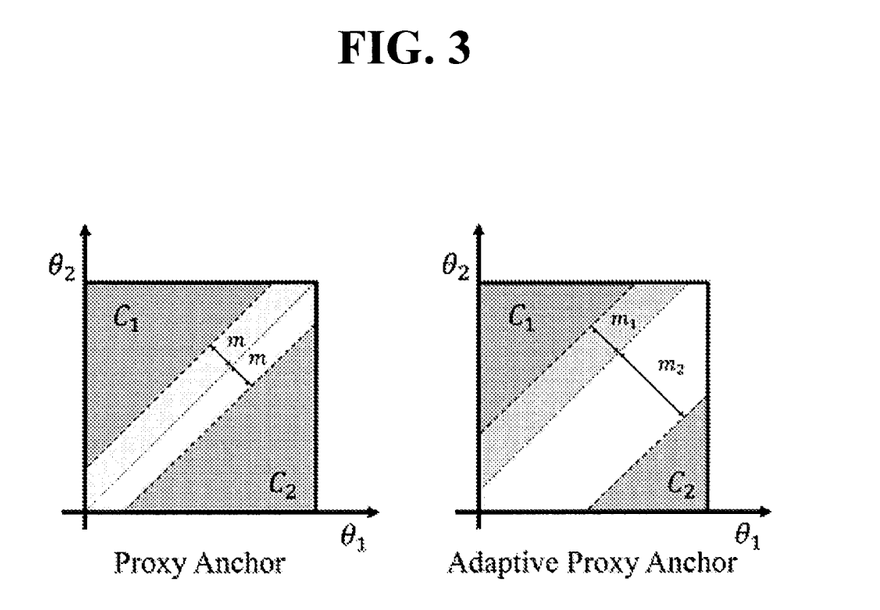
FIG. 3 shows a theoretical comparison of a decision margin between a Proxy Anchor method and the method according to the invention.

FIG. 3 shows a theoretical comparison of a decision margin between PA [12] and the proposed APA of the invention for two classes. $C_1$ is a hard class and $C_2$ is an easy class. The dotted line represents the actual decision boundary between the two classes. The areas between the dashed lines and dotted lines are decision margins or confidence levels the machine learning model has in regard to decision boundaries of the machine learning model for $C_1$ and $C_2$. It can be seen from FIG. 3 that different margins (i.e., $m_1$, $m_2$) are assigned to different classes $C_1$ and $C_2$ in the proposed APA method while a single margin is calculated for different classes $C_1$ and $C_2$ in the PA method.

Accordingly, the proposed APA was compared with seven existing metric learning methods on four datasets: CUB-200-2011, Cars-196, SOP, and In-shop. Tables 2 and 3 summarize the results of the methods on the four datasets. Note that the experiments of PA and APA with ResNet-50 were conducted, and with an embedding dimension of 512 for a fair comparison. The results of the other methods are based on published numbers.

TABLE 2

Comparison to other methods on CUB-200-2011, Cars-196, Stanford Online Products datasets. The top performances are highlighted in bold. All methods are compared with the size of 512-embedding, except ProxyNCA with 64-embedding. BN: Inception with batch normalization, R50: ResNet-50.

| | | CUB-200-2011 | | | | Cars-196 | | | | SOP | | | |
|---|---|---|---|---|---|---|---|---|---|---|---|---|---|
| R@K(%) | | 1 | 2 | 4 | 8 | 1 | 2 | 4 | 8 | 1 | 10 | 100 | 1000 |
| Multi-Similarity [11] | BN | 65.7 | 77.0 | 86.6 | 91.2 | 84.1 | 90.4 | 94.0 | 96.5 | 78.2 | 90.5 | 96.0 | 98.7 |
| NormSoftmax [21] | R50 | 65.3 | 76.7 | 85.4 | 91.8 | 89.3 | 94.1 | 96.4 | 98 | 79.5 | 91.5 | 96.7 | — |
| Cross-Entropy [22] | R50 | 69.2 | 79.2 | 86.9 | 91.6 | 89.3 | 93.9 | 96.6 | 98.4 | 81.1 | 91.7 | 96.3 | 98.8 |
| EPSHN [23] | R50 | 64.9 | 75.3 | 83.5 | — | 82.7 | 89.3 | 93.0 | — | 78.3 | 90.7 | 96.3 | — |

TABLE 2-continued

Comparison to other methods on CUB-200-2011, Cars-196, Stanford Online Products datasets. The top performances are highlighted in bold. All methods are compared with the size of 512-embedding, except ProxyNCA with 64-embedding. BN: Inception with batch normalization, R50: ResNet-50.

| R@K(%) | | CUB-200-2011 | | | | Cars-196 | | | | SOP | | | |
|---|---|---|---|---|---|---|---|---|---|---|---|---|---|
| | | 1 | 2 | 4 | 8 | 1 | 2 | 4 | 8 | 1 | 10 | 100 | 1000 |
| Proxy Anchor [12] | R50 | 70.2 | 79.7 | 87.0 | 92.0 | 89.2 | 93.8 | 96.0 | 97.8 | 80.5 | 91.4 | 96.4 | 98.7 |
| ProxyNCA++ [15] | R50 | 69.0 | 79.8 | 87.3 | 92.7 | 86.5 | 92.5 | 95.7 | 97.7 | 80.7 | 92.0 | 96.7 | 98.9 |
| Intra-Batch [24] | R50 | 70.3 | 80.3 | 87.6 | 92.7 | 88.1 | 93.3 | 96.2 | 98.2 | 81.4 | 91.3 | 95.9 | — |
| Proposed APA | R50 | 70.5 | 79.6 | 87.2 | 92.2 | 98.3 | 94.4 | 96.8 | 98.0 | 81.4 | 92.1 | 96.8 | 98.8 |

TABLE 3

Comparison to other methods on In-Shop clothes Retrieval dataset. The top performances are highlighted in bold. All methods are compared with the size of 512-embedding, BN: Inception with batch normalization, R50: ResNet-50.

| R@K(%) | | In-shop | | |
|---|---|---|---|---|
| | | 1 | 10 | 20 |
| Multi-Similarity [11] | BN | 89.7 | 97.9 | 98.5 |
| NormSoftmax [21] | R50 | 89.4 | 97.8 | 98.7 |
| Cross-Entropy [22] | R50 | 90.6 | 98.0 | 98.6 |
| EPSHN [23] | R50 | 87.8 | 95.7 | 96.8 |
| Proxy Anchor [12] | R50 | 91.5 | 97.5 | 98.2 |
| ProxyNCA++ [15] | R50 | 90.4 | 98.1 | 98.8 |
| Intra-Batch [24] | R50 | 92.8 | 98.5 | 99.1 |
| Proposed APA | R50 | 91.5 | 97.5 | 98.3 |

As can be seen from Tables 2 and 3, the proposed APA method improves the performance of PA without the need of choosing an optimal margin in many trials. Note that the best results for PA over several margins are reported. Furthermore, the proposed APA method outperforms arts in almost all settings, with the highest R@1 score on CUB-200-2011 at 70.7%, Cars-196 at 90.3%, and SOP at 81.4%. APA achieves a slightly lower recall than Intra-batch [24], 91.5% compared to 92.8%. The experimental results demonstrate the convenience of using the adaptive margins and the superiority of the proposed APA method.

Figure 4:
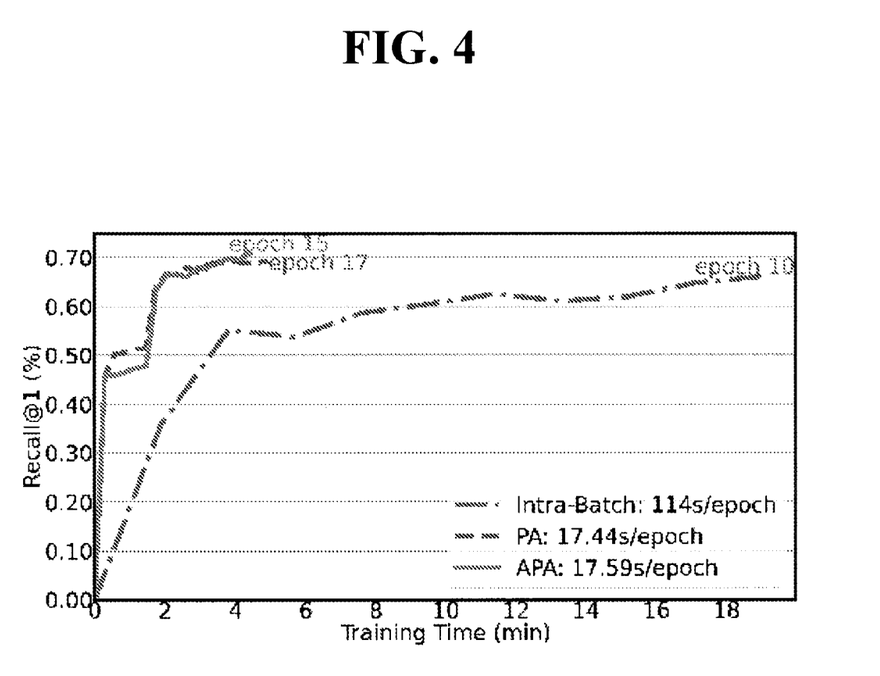
FIG. 4 is a diagram which evaluates the training complexity of several methods.

FIG. 4 shows the convergence speed of the proposed APA, AP [12], and Intra-Batch [24], thereby the training complexity, which plays a crucial role in deep learning was evaluated.

The results show that the proxy-anchor approach proves effective and efficient during training, and the APA loss steadily maintains this training convergence property.

3. Ablation Study
3.1. From Multi-Margin to Single Margin.

APA can be configured with single-margin (the same margin value for all classes) or multi-margin (an individual margin for each class). The class margin values were recorded during training on the In-shop dataset and plotted the range of values over training time in FIG. 5.

Figure 5:
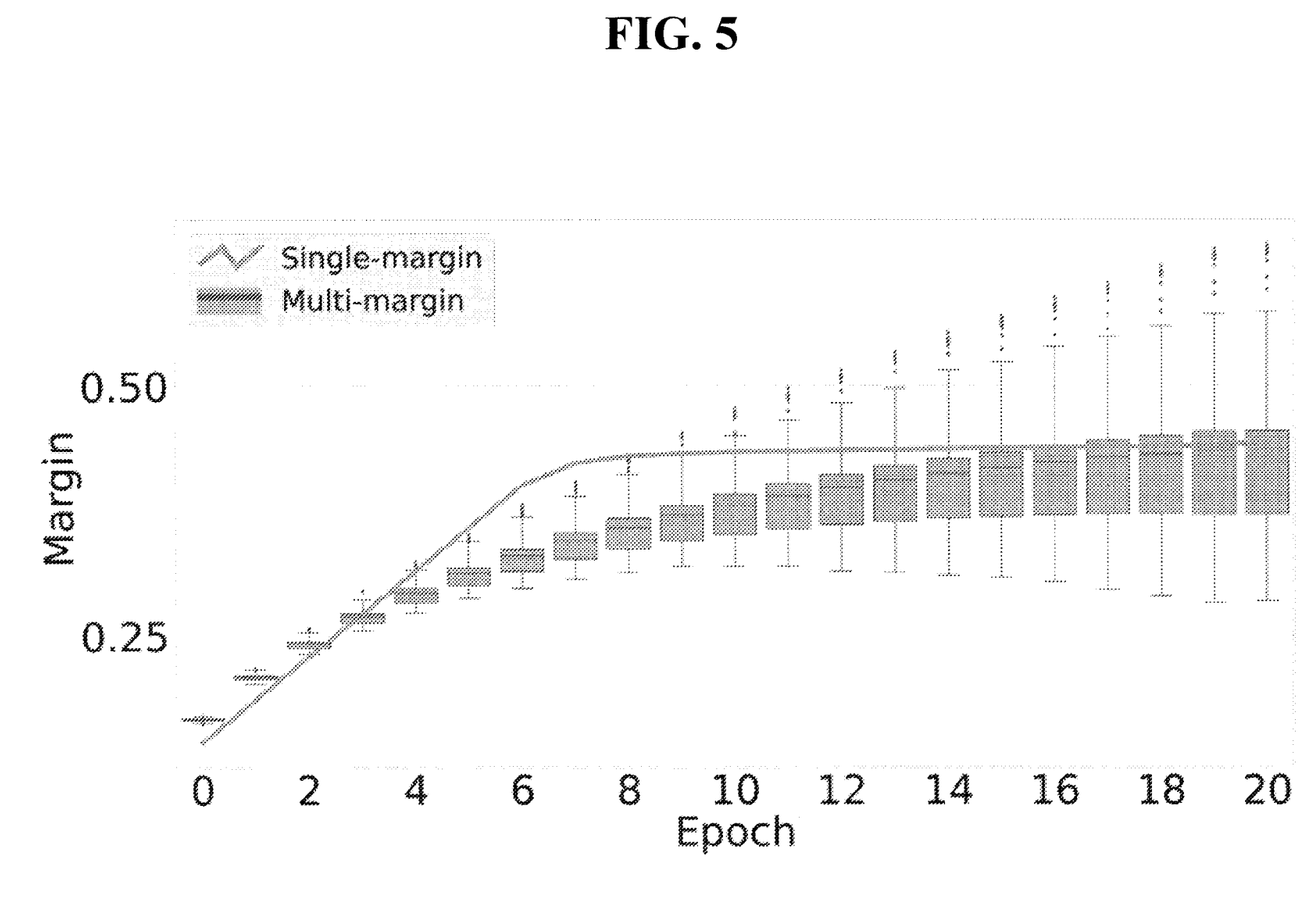
FIG. 5 shows a relation between multi-margin and single margin during training.

In the multi-margin setting, the margin value range (box-plots) broadens as the training progresses. This phenomenon implies the necessity of choosing a suitable class margin value for optimal performance in each dataset. In the single-margin setting, the margin (curved line) converges to the mean margin value of the multi-margin setting, indicating a correlation between the two settings.

The two settings were benchmarked on four datasets (see Table 4). The results show that the single-margin setting is marginally better than the multi-margin. Having a specific margin for each class in the training distribution leads to an overfit. Because the classes in the test set are unseen during training, multi-margin settings hamper the generalization of the algorithm on the test dataset. Therefore, the use of single margin settings is recommended in the proxy-anchor metric learning to avoid this effect and attain better performance.

TABLE 4

Comparison the effect of single-margin and multimargin to the performance on four public datasets. All the results are reported with R@1 (%) for the value $\lambda = 1$.

| Datasets | CUB-200-2011 | Cars-196 | SOP | In-shop |
|---|---|---|---|---|
| Multi-margin | 70.1 | 88.9 | 80.0 | 90.9 |
| Single-margin | 70.5 | 90.3 | 81.4 | 91.5 |

Figure 6:
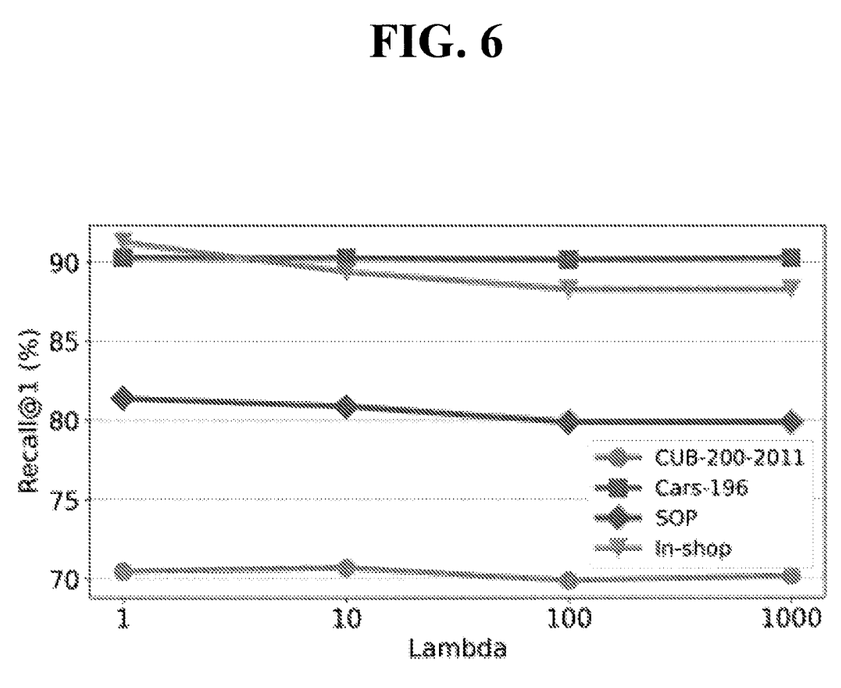
FIG. 6 shows the effect of a scaling factor during training.

3.2. Effect of Scaling Factor $\lambda$ The effect of the scaling parameter $\lambda$ was examined by conducting experiments with different values of $\lambda \in \{1,10,100,1000\}$ on the four datasets. The experimental results in FIG. 6 show that there is a negligible difference in the range of the scaling parameter $\lambda$ from 1 to 1000, making it unnecessary to tune this hyperparameter. $\lambda$ is recommended to be set to 1.

In summary, the present disclosure provides the proxy anchor metric learning method to reduce the requirement of expertise and time for selecting the best margin value. The system and method of the invention, called adaptive proxy anchor (APA), adaptively adjusts the margin for corresponding domains during training. APA achieves state of the art on three public datasets, i.e. CUB-200-2011, Cars-196, and SOP, while maintaining the fast convergence rate compared to the proxy anchor method. The margin behavior was also studied to highlight the effect of the optimal value.

The described invention and appended claims comprises specific technical features, and to be a technical solution to solve a technical problem to create a technical effect beyond normal physical interactions/effects between the program and the computer. Therefore, the invention is deemed as a computer-implemented invention.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

In particular, although FIG. 2 respectively depicts steps performed in a particular order for purposes of illustration and discussion, the methods of the present disclosure are not limited to the particularly illustrated order or arrangement. The various steps of the method 200 can be omitted, rearranged, combined, and/or adapted in various ways without deviating from the scope of the present disclosure.

The invention claimed is:

1. A computer system for performing distance metric learning using proxies, the computer system comprising:
   a machine learning model configured to receive input data points and, in response, provide respective embedding vectors for the input data points within an embedding space;
   one or more processors; and
   one or more non-transitory computer readable media that collectively store instructions that, when executed by the one or more processors cause the computer system to perform operations, the operations comprising:
      accessing a training dataset that comprises a plurality of data points, wherein the plurality of data points is respectively associated with a plurality of classes;
      accessing at least one proxy that represents two or more data points included in the training dataset, wherein the at least one proxy and the two or more data points are associated with a first class;
      processing a first subset of data points in the plurality of data points that are associated with the first class and a second subset of data points in the plurality of data points that are associated with one or more classes that are different from the first class using a machine learning model to generate a positive subset of embedding vectors and a negative subset of embedding vectors, respectively;
      determining an intra-class loss that measures a first distance between the at least one proxy and each positive embedding vector in the positive subset of embedding vectors, wherein the intra-class loss further comprises a first learnable margin parameter assigned for the first class to measure a confidence level the machine learning model has in regard to a decision boundary of the machine learning model for the first class;
      determining an inter-class loss that measures a second distance between the at least one proxy and each negative embedding vector in the negative subset of embedding vectors; wherein the inter-class loss further comprises one or more learnable margin parameters assigned for the one or more classes to measure confidence levels the machine learning model has in regard to decision boundaries of the machine learning model respectively for the one or
      determining a margin loss that is calculated as a mean of the first learnable margin parameter and the one or more learnable margin parameters to control the variance of the first learnable margin parameter and the one or more learnable margin parameters; and
      adjusting the first learnable margin parameter and the one or more learnable margin parameters of the machine learning model based at least on the intra-class loss, the inter-class loss and the margin loss.

2. The computer system of claim 1, wherein the operations further comprise prior to accessing the at least one proxy:
   initializing a plurality of proxies in the training dataset; and
   respectively associating the plurality of proxies with the plurality of classes.

3. The computer system of claim 2, wherein the plurality of data points comprises images which are resized and cropped to a predetermined size.

4. The computer system of claim 3, wherein the adjusting of the first learnable margin parameter and the one or more learnable margin parameters comprises jointly backpropagating the intra-class loss, the inter-class loss and the margin loss through the machine learning model.

5. The computer system of claim 4, wherein the machine learning model comprises a deep neural network.

6. The computer system of claim 5, wherein the operations further comprise after adjusting one or more parameters of the machine learning model based at least on the intra-class loss, the inter-class loss and the margin loss:
   employing the machine learning model to perform a face recognition task or an image retrieval task.

7. A computer-implemented method for performing distance metric learning using proxies, the method comprising:
   accessing, by one or more computing devices, a training dataset that comprises a plurality of data points, wherein the plurality of data points is respectively associated with a plurality of classes;
   accessing, by the one or more computing devices, at least one proxy that represents two or more data points included in the training dataset, wherein the at least one proxy and the two or more data points are associated with a first class;
   processing, by the one or more computing devices, a first subset of data points in the plurality of data points that are associated with the first class and a second subset of data points in the plurality of data points that are associated with one or more classes that are different from the first class using a machine learning model to generate a positive subset of embedding vectors and a negative subset of embedding vectors, respectively;
   determining, by the one or more computing devices, an intra-class loss that measures a first distance between the at least one proxy and each positive embedding vector in the positive subset of embedding vectors, wherein the intra-class loss further comprises a first learnable margin parameter assigned for the first class to measure a confidence level the machine learning model has in regard to a decision boundary of the machine learning model for the first class;
   determining, by the one or more computing devices, an inter-class loss that measures a second distance between the at least one proxy and each negative embedding vector in the negative subset of embedding vectors; wherein the inter-class loss further comprises one or more learnable margin parameters assigned for the one or more classes to measure confidence levels the machine learning model has in regard to decision boundaries of the machine learning model respectively for the one or more classes;

determining, by the one or more computing devices, a margin loss that is calculated as a mean of the first learnable margin parameter and the one or more learnable margin parameters to control the variance of the first learnable margin parameter and the one or more learnable margin parameters; and adjusting, by the one or more computing devices, the first learnable margin parameter and the one or more learnable margin parameters of the machine learning model based at least on the intra-class loss, the inter-class loss and the margin loss.

8. The computer-implemented method of claim 7, further comprising, prior to processing the at least one proxy:

initializing, by the one or more computing devices, a plurality of proxies in the training dataset; and respectively associating, by the one or more computing devices, the plurality of proxies with the plurality of classes.

9. The computer-implemented method of claim 8, wherein the plurality of data points comprises images which are resized and cropped to a predetermined size.

10. The computer-implemented method of claim 9, wherein the adjusting, by the one or more computing devices, of the first learnable margin parameter and the one or more learnable margin parameters comprises jointly backpropagating, by the one or more computing devices, the intra-class loss, the inter-class loss and the margin loss through the machine learning model.

11. The computer-implemented method of claim 10, wherein the machine learning model comprises a deep neural network.

12. The computer-implemented method of claim 11, further comprising, after adjusting, by the one or more computing devices, one or more parameters of the machine learning model based at least on the intra-class loss, the inter-class loss and the margin loss:

employing, by the one or more computing devices, the machine learning model to perform a face recognition task or an image retrieval task.

* * * * *